United States Patent
Ha et al.

(10) Patent No.: US 7,847,881 B2
(45) Date of Patent: Dec. 7, 2010

(54) DIFFUSION PLATE, BACKLIGHT ASSEMBLY, LIQUID CRYSTAL DISPLAY HAVING THE SAME AND METHOD OF FORMING THEREOF

(75) Inventors: Ju-hwa Ha, Seoul (KR); Jin-soo Kim, Seoul (KR); Byung-yun Joo, Goyang-si (KR); Jung-wook Paek, Suwon-si (KR); Min-young Song, Daejeon (KR)

(73) Assignee: Samsung Electronics Co., Ltd. (KR)

( * ) Notice: Subject to any disclaimer, the term of this patent is extended or adjusted under 35 U.S.C. 154(b) by 994 days.

(21) Appl. No.: 11/611,383

(22) Filed: Dec. 15, 2006

(65) Prior Publication Data

US 2007/0236627 A1    Oct. 11, 2007

(30) Foreign Application Priority Data

Apr. 6, 2006    (KR) .................... 10-2006-0031504

(51) Int. Cl.
*G02F 1/1335*    (2006.01)

(52) U.S. Cl. ........................................ 349/64

(58) Field of Classification Search ............ None
See application file for complete search history.

(56) References Cited

U.S. PATENT DOCUMENTS

| | | | | |
|---|---|---|---|---|
| 5,684,550 | A | * | 11/1997 | Shibata et al. ............... 349/62 |
| 6,104,455 | A | * | 8/2000 | Kashima ..................... 349/65 |
| 7,271,862 | B2 | * | 9/2007 | Matsunaga et al. ........... 349/64 |
| 2003/0002158 | A1 | * | 1/2003 | Masaki et al. ............... 359/599 |

* cited by examiner

*Primary Examiner*—David Nelms
*Assistant Examiner*—Lucy P Chien
(74) *Attorney, Agent, or Firm*—Cantor Colburn LLP (57) ABSTRACT

A diffusion plate that is capable of improving a display quality, and a backlight assembly and a liquid crystal display ("LCD") including the same are disclosed. The diffusion plate includes a base layer including of a first optically transparent resin and a first coating layer provided on a first surface of the base layer. The first coating layer includes a second optically transparent resin and random embossings. The first surface including the embossings has a 60° gloss of 15% or less. A method of forming a diffusion plate includes forming a base layer including a first optically transparent resin, providing random embossings on the base layer and sizing the diffusion plate to predetermined dimensions.

12 Claims, 7 Drawing Sheets

# DIFFUSION PLATE, BACKLIGHT ASSEMBLY, LIQUID CRYSTAL DISPLAY HAVING THE SAME AND METHOD OF FORMING THEREOF

This application claims priority to Korean Patent Application No. 10-2006-0031504 filed on Apr. 6, 2006, and all the benefits accruing therefrom under 35 U.S.C. §119, the contents of which are incorporated herein by reference in its entirety.

BACKGROUND OF THE INVENTION

1. Field of the Invention

The present invention relates to a diffusion plate, backlight assembly and liquid crystal display having the same, and more particularly to a diffusion plate, a backlight assembly and a liquid crystal display ("LCD") having an improved display quality.

2. Description of the Related Art

Liquid crystal displays ("LCDs") are light receiving display devices in which images are produced not by self-emission but by external light. The LCDs need external light sources to display the images since the LCDs themselves do not directly emit light. When using LCDs, backlight units are installed at a rear surface of the LCDs to illuminate the LCDs.

The backlight assemblies are mainly classified according to the arrangement of the light sources into an edge type and a direct type. In a direct type backlight assembly, a plurality of lamps is installed in parallel and a support is disposed between each of the plurality of lamps to support the plurality of lamps and a diffusion plate.

In some circumstances, the diffusion plate may become scratched due to contact with the support and the diffusion plate in the course of storage or transportation of the diffusion plate or the backlight assembly including the diffusion plate. Any scratches occurring to the diffusion plate may prevent light from being normally diffused therefrom, deteriorating the display quality of an LCD. One attempt to minimize the contact between the support and the diffusion plate is to form embossings on a surface of the diffusion plate by adding beads to a skin layer of the diffusion plate, thereby reducing the occurrence of scratches or cracking. Alternatively, a method has been proposed for preventing the diffusion plate from being bent due to moisture absorption by additionally providing a protective film made of polyethylene.

However, since the beads are stripped from the skin layer of the diffusion plate, the beads straying within the backlight assembly are perceived as black spots, deteriorating the display quality. Another problem with the use of the protective film is an increased manufacturing cost. Accordingly, it is desirable to provide a diffusion plate capable of improving the display quality while reducing the manufacturing cost, and a backlight assembly and an LCD including the same.

BRIEF SUMMARY OF THE INVENTION

An exemplary embodiment provides a diffusion plate capable of improving a display quality while reducing the manufacturing cost.

An exemplary embodiment provides a backlight assembly capable of improving a display quality.

An exemplary embodiment provides a liquid crystal display (LCD) having an improved display quality by including the diffusion plate and the backlight assembly.

In an exemplary embodiment there is provided a diffusion plate including a base layer including a first optically transparent resin and a first coating layer provided on a first surface of the base layer including a second optically transparent resin and random embossings. The first surface including the embossings has a 60° gloss of 15% or less.

In an exemplary embodiment there is provided a diffusion plate made of an optically transparent resin The diffusion plate includes a light diffuser and random embossings formed on a first surface of the diffuser The first surface including the random embossings has a 60° gloss of 15% or less.

In an exemplary embodiment there is provided a backlight assembly including a diffusion plate, a plurality of lamps and a support. The diffusion plate includes a base layer includes of a first optically transparent resin and a first coating layer provided on a first surface of the base layer. The first coating layer includes a second optically transparent resin and random embossings. The first surface including the embossings has a 60° gloss of 15% or less. The lamps face and are opposite to the first coating layer and provide the diffusion plate with light. The support is disposed between each of the plurality of lamps and supports the plurality of lamps and the diffusion plate.

In an exemplary embodiment, there is provided a liquid crystal display ("LCD") including a backlight assembly and a liquid crystal panel assembly. The backlight assembly includes a diffusion plate, a plurality of lamps and a support. The diffusion plate includes a base layer includes a first optically transparent resin and a first coating layer provided on a first surface of the base layer. The first coating layer includes a second optically transparent resin and random embossings. The first surface including the embossings has a 60° gloss of 15% or less. The plurality of lamps face and are opposite to the first coating layer and providing the diffusion plate with light. The support is disposed between each of the plurality of lamps and supports the plurality of lamps and the diffusion plate. The liquid crystal panel assembly is disposed on top of the backlight assembly and provided with the light from the backlight assembly to display predetermined images.

In an exemplary embodiment there is provided a method of forming a diffusion plate. The method includes forming a base layer including a first optically transparent resin, providing random embossings on the base layer and sizing the diffusion plate to predetermined dimensions. The providing random embossings includes forming random embossings on a first coating layer and providing the first coating layer on a first surface of the base layer. The first coating layer includes a second optically transparent resin. The first surface has a 60° gloss of 15% or less.

BRIEF DESCRIPTION OF THE DRAWINGS

The above and other features and advantages of the present invention will become apparent by describing in detail exemplary embodiments thereof with reference to the attached drawings in which.

DETAILED DESCRIPTION OF THE INVENTION

Advantages and features of the present invention and methods of accomplishing the same may be understood more readily by reference to the following detailed description of preferred embodiments and the accompanying drawings. The present invention may, however, be embodied in many different forms and should not be construed as being limited to the embodiments set forth herein. Rather, these embodiments are provided so that this disclosure will be thorough and complete and will fully convey the concept of the invention to those skilled in the art, and the present invention will only be defined by the appended claims. Like reference numerals refer to like elements throughout the specification. In the drawings, the size and relative sizes of layers and regions may be exaggerated for clarity.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. Like numbers refer to like elements throughout. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the invention are described herein with reference to cross-section illustrations that are schematic illustrations of idealized embodiments (and intermediate structures) of the invention. As such, variations from the shapes of the illustrations as a result, for example, of manufacturing techniques and/or tolerances, are to be expected. Thus, embodiments of the invention should not be construed as limited to the particular shapes of regions illustrated herein but are to include deviations in shapes that result, for example, from manufacturing.

For example, an implanted region illustrated as a rectangle will, typically, have rounded or curved features and/or a gradient of implant concentration at its edges rather than a binary change from implanted to non-implanted region. Likewise, a buried region formed by implantation may result in some implantation in the region between the buried region and the surface through which the implantation takes place. Thus, the regions illustrated in the figures are schematic in nature and their shapes are not intended to illustrate the actual shape of a region of a device and are not intended to limit the scope of the invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. Hereinafter, a backlight assembly according to an embodiment of the present invention will be described with reference to FIGS. 1 through 3.

Figure 1:
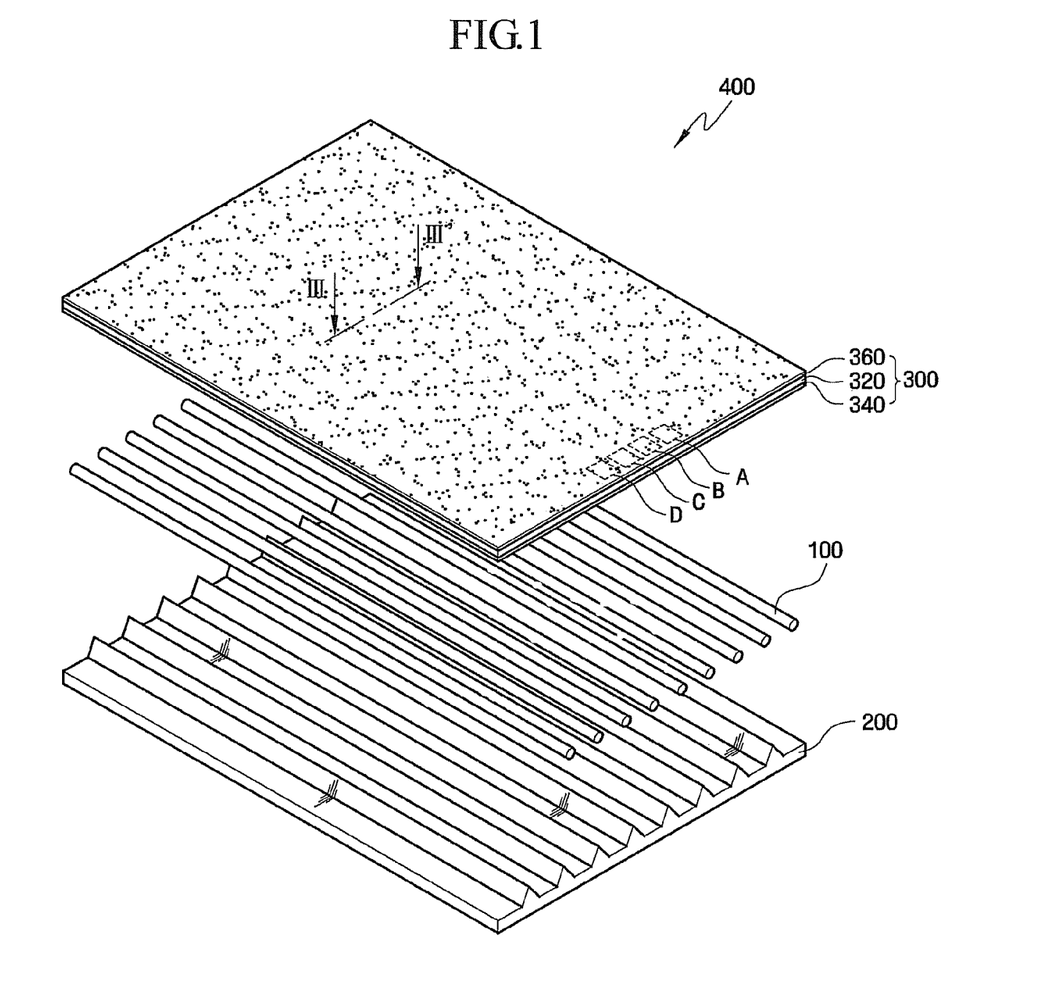
FIG. 1 is an exploded perspective view of an exemplary embodiment of a backlight assembly according to the present invention.
Figure 2A:
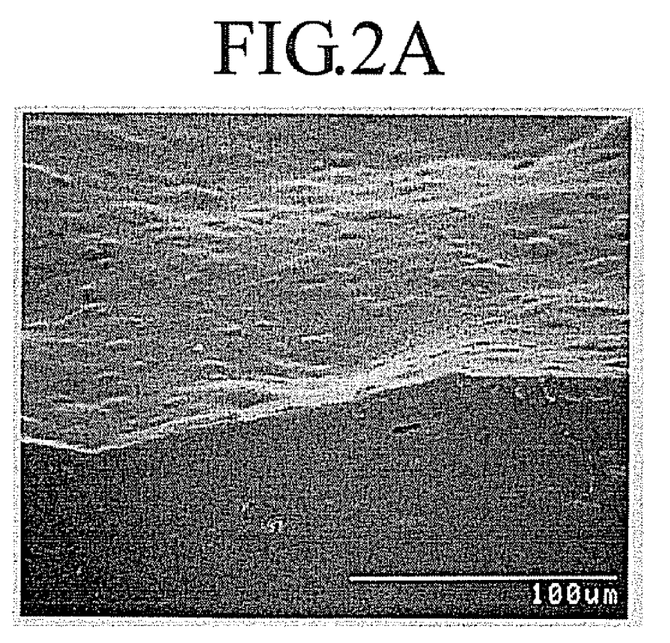
FIGS. 2A-2D are perspective views of embossings formed on regions A through D, respectively, of the diffusion plate in FIG. 1 according to the present invention.
Figure 2B:
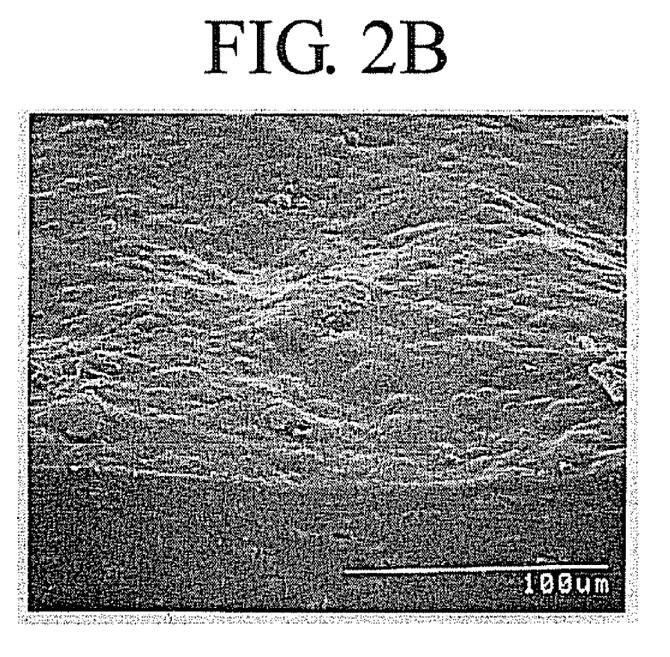
Figure 2C:
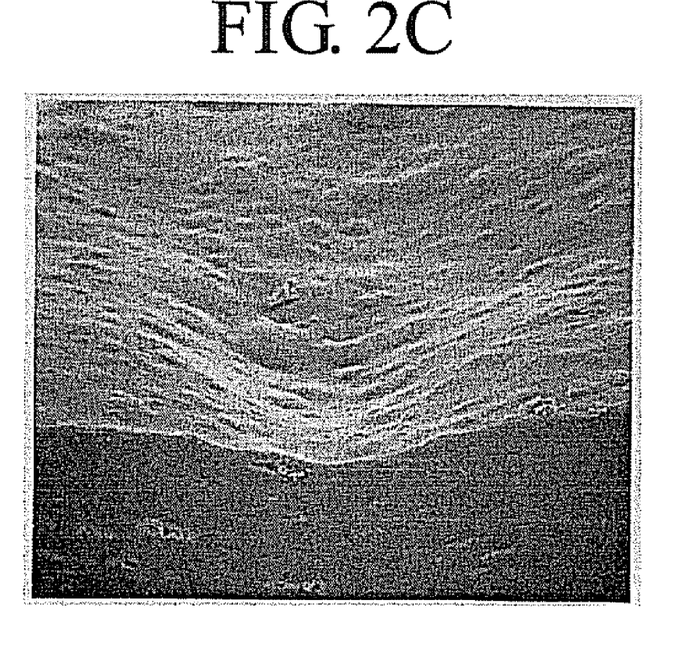
Figure 2D:
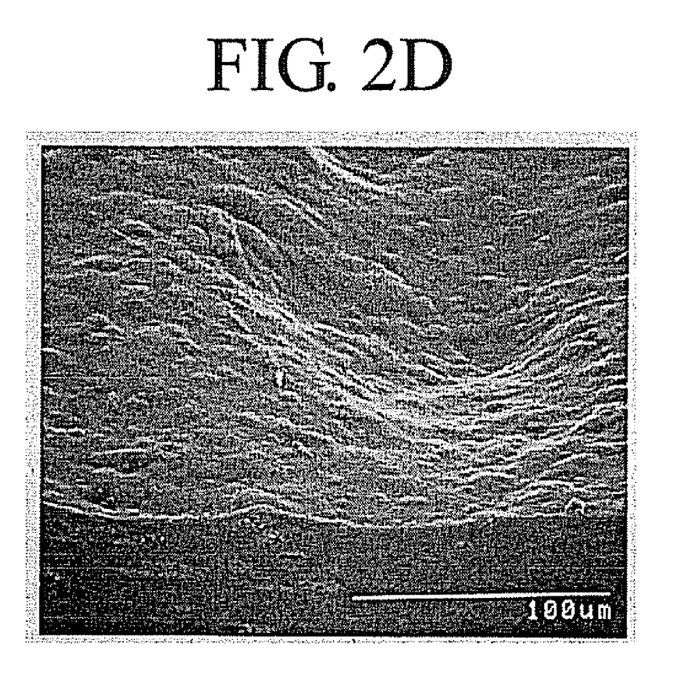
Figure 3:
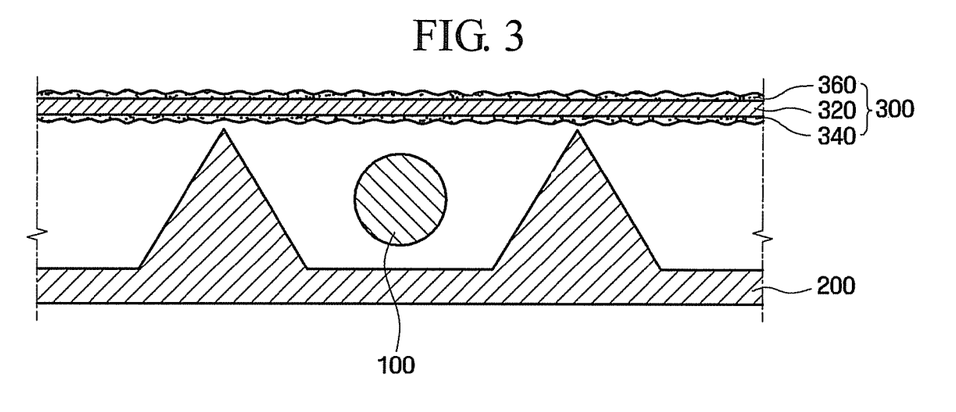
FIG. 3 is a cross-sectional view of the backlight assembly taken along line III-III' illustrated in FIG. 1.

FIG. 1 is an exploded perspective view of an exemplary embodiment of a backlight assembly 400 according to the present invention, FIGS. 2A-2D are perspective views of embossings formed on regions A-D, respectively, of a diffusion plate illustrated in FIG. 1 according to the present invention and FIG. 3 is a cross-sectional view of the backlight assembly 400 taken along line III-III' illustrated in FIG. 1.

Referring to FIG. 1, the backlight assembly 400 includes a plurality of lamps 100, a support 200 and a diffusion plate 300.

The plurality of lamps 100 are arranged substantially in parallel with and spaced at a predetermined space apart from one another. The plurality of lamps 100 is of a direct-type, and provides a liquid crystal panel assembly (not shown) with light. In exemplary embodiments, the plurality of lamps 100 may be external electrode fluorescent lamps ("EEFLs"), but the present invention is not limited thereto, and light emitting diodes ("LEDs"), cold cathode fluorescent lamps ("CCFLs"), and any other types of light sources that can provide the liquid crystal panel assembly with light can be used.

The support 200 is positioned between each of the plurality of lamps 100 and supports the plurality of lamps 100. In addition, the support 200 supports the diffusion plate 300. Referring to FIG. 1, the support 200 is disposed between each of the plurality of lamps 100 along the length of the plurality of lamps 100 in a substantially triangular columnar arrangement. However, the arrangement of the support 200 is not limited to the exemplary embodiment illustrated in FIG. 1 and a triangular pyramidal support may be installed at a predetermined space apart from each of the plurality of lamps 100. In exemplary embodiments, the support 200 may be integrally formed with a reflective plate (not shown) serving to reflect light supplied from the plurality of lamps 100 back to the liquid crystal panel assembly (not shown).

The diffusion plate 300 includes a base layer 320 and first and second coating layers 340 and 360. The diffusion plate 300 is disposed over the plurality of lamps 100 and the support 200, and diffuses light supplied from the plurality of lamps 100 and provides the liquid crystal panel assembly with uniform light.

In exemplary embodiments, the base layer 320 may be made of an optically transparent resin including, but not limited to, polymethylmethacrylate ("PMMA"), methylstyrene ("MS"), polystyrene ("PS"), polycarbonate ("PC"), and the like. In an exemplary embodiment, the base layer 320 may be made of a polyester-based polymer such as polyethylene terephthalate ("PET") or polyethylene naphthalate, a cellulose-based polymer such as diacetylcellulose or triacetylcellulose, an olefin-based polymer, a vinylchloride-based polymer, an amide-based polymer, or the like, but the present invention is not limited thereto.

Referring to FIGS. 2A though 2D, random (in dimension and arrangement) embossings are formed on the first and second coating layers 340 and 360. "Ra" is considered to indicate the average surface roughness and "Rz" indicates the average of the maximum surface roughness values measured at 5 locations produced by dividing a zone into five sections. The random embossings may be formed on the first and second coating layers 340 and 360 such that a plane having the random embossings has an average surface roughness ("Ra") of not greater than 10 microns (μm) and an average maximum surface roughness ("Rz") of not great than 20 microns (μm). However, formation patterns of the embossings are not limited to the illustrated exemplary embodiments, and widths and depths of the embossings and distances between each of the concavities formed in the embossings may be randomly formed in a wide variety of manners such as is suitable for the purposes described herein.

As shown in FIG. 2A through 2D, since the random embossings are formed on the first and second coating layers 340 and 360, stresses due to a contact between the support 200 and each of the first and second coating layers 340 and 360 can be minimized. As in the illustrated exemplary embodiment, the support 200 and each of the first and second coating layers 340 and 360 may make contact with each other in several manners. The support 200 and each of the first and second coating layers 340 and 360 may experience surface-surface contact, surface-spot contact and spot-spot contact.

When the support 200 and each of the first and second coating layers 340 and 360 make contact with each other in a surface-surface contact manner, the contact stress is relatively the largest. When the support 200 and each of the first and second coating layers 340 and 360 make contact with each other in a spot-spot contact manner, the contact stress is relatively smallest. In a conventional diffusion plate (not shown) without random embossings, the diffusion plate may make contact with a support in a surface-surface contact manner or a surface-spot contact manner according to the shape of the support. Accordingly, cracking of the diffusion plate becomes severe due to contact stress.

As shown in FIG. 3, in the diffusion plate 300 for use in the backlight assembly 400, random embossings are formed on the first and second coating layers 340 and 360. The diffusion plate 300 makes contact with the support 200 in a spot-spot contact manner, thereby minimizing contact stress and potential cracking of the diffusion plate 300. If the occurrence of cracking of the diffusion plate 300 is suppressed, deterioration in the display quality due to cracking is lowered, thereby improving the display quality.

A gloss value of a plane where random embossings are formed indicates an extent (frequency, density and/or dimension) of the random embossings formed thereon. The more the embossings are formed on the plane, the lower the gloss value of the plane. The embossings may be formed on the first coating layer 340 making contact with the support 200 such that a 60° gloss value of the first coating layer 340 is not greater than 15%. A gloss value may be specularly measured at an incidence angle of 60 degrees by ASTM (American Society for Testing and Materials) Standard D-2457 (Standard Test Method for Specular Gloss of Plastic Films and Solid Plastics) or D-523 (Standard Test Method for Specular Gloss).

TABLE 1

Experimental Results on Cracking and Scratching of Diffusion Plate

| Experimental State | | MS (H-2H) | PS (HB-H) | PC (2B) |
| --- | --- | --- | --- | --- |
| Before forming embossings | Cracking Scratches | Slight Observed | Moderate Observed | Severe Observed |
| After forming embossings (15% of gloss) | Cracking Scratches | Rare Not observed | Rare Not observed | Slight Not observed |

Table 1 summarizes results of an experiment carried out to evaluate cracking and scratches of the diffusion plate before and after forming random embossings on the diffusion plate according to the kind of optically transparent resin constituting the first coating layer 340.

Before the embossings are formed on the diffusion plate, scratches are observed due to cracking. In a case where the first coating layer 340 is made of MS having pencil hardness of H-2H, cracking observed was slight while scratches were observed from an image plane. Since PS and PC have pencil hardness levels of HB-H and 2B, respectively, a relatively high extent of cracking was observed and scratches were observed in both cases.

However, if the random embossings are formed such that the 60° gloss is approximately 15%, the cracking of the diffusion plate was reduced and no scratching was observed on an image plane. Advantageously, when the random embossings are formed on the first coating layer 340 such that the 60° gloss is adjusted to be not greater than 15%, a display quality can be improved. In one exemplary embodiment, the 60° gloss is adjusted to be in a range of about 5% to about 15%.

Referring again to FIG. 3, the random embossings may also be formed on the second coating layer 360. A plurality of optical members (not shown) may be disposed over the diffusion plate 300 and embossings or patterns for performing a particular function, e.g., diffusion, may be formed on the plurality of optical members. Cracking of the diffusion plate 300 may be caused due to a contact between the embossings or patterns formed on the plurality of optical members. To avoid this, the random embossings may be formed on the second coating layer 360. In exemplary embodiments, the diffusion plate 300 may include random embossing on the first coating layer 340 and/or the second coating layer 360.

Here, since the cracking of the second coating layer 360 due to the plurality of optical members is not more severe than the cracking of the first coating layer 340 due to the support 200, the embossed surface of the second coating layer 360 may have a higher 60° gloss than the embossed surface of the first coating layer 340. In greater detail, the embossings may be formed on the second coating layer 360 such that the second coating layer 360 has a 60° gloss of 20% or less. In this case, improved brightness can be ensured. In exemplary embodiments, the gloss value of the first coating layer 340 and the second coating layer 360 may be substantially the same or different.

In addition, if the embossings are formed more, such as in larger frequency or density, on the first coating layer 340 than on the second coating layer 360, bending of the diffusion plate 300 can be further suppressed and a Mura phenomenon can be avoided, which will be described below.

When power is applied to the backlight assembly 400, a temperature rise occurs to an area adjacent to the plurality of lamps 100, resulting in a temperature difference between the area adjacent to the vicinity of the plurality of lamps 100 and a non-adjacent area in view of the diffusion plate 300. The temperature difference and evaporation or absorption of moisture due to the temperature difference make the diffusion plate 300 bend in a direction opposite to the plurality of lamps 100. In such a case, the liquid crystal panel assembly (not shown) disposed over the diffusion plate 300 may be pressurized by the diffusion plate 300, so that a liquid crystal layer may be twisted and a Mura defect will inevitably appear.

In a case where the embossings are formed in larger frequency or density on the first coating layer 340 than on the second coating layer 360, a surface area of the first coating layer 340 is wider than that of the second coating layer 360. Thus, it is possible to reduce or effectively suppress the diffusion plate 300 from being bent toward the liquid crystal panel assembly (not shown), thereby avoiding a Mura phenomenon and ultimately improving a display quality. Advantageously, since a protective film made of polyethylene is not necessary, the manufacturing cost can be reduced.

In exemplary embodiments, a difference in the 60° gloss between the first coating layer 340 and the second coating layer 360 may not be greater than 15%. If the difference in the 60° gloss between the first coating layer 340 and the second coating layer 360 is greater than 15%, the brightness of the backlight assembly 400 may become poor. As an illustrated exemplary embodiment, when the 60° gloss of the second coating layer 360 is 19% and the 60° gloss of the first coating layer 340 is 2%, a relatively large number of embossings will be formed on the first coating layer 340, suggesting that the backlight assembly 400 has a poor brightness characteristic. In one exemplary embodiment of the present invention, the 60° gloss of the first coating layer 340 is in a range of 5% to 15% and the 60° gloss of the second coating layer 360 is approximately 20%.

The base layer 320 and the first and second coating layers 340 and 360 may all include a light diffuser, an antistatic agent, and/or an ultraviolet (UV) blocking agent. Exemplary embodiments of the light diffuser include an inorganic material or an organic material. In one exemplary embodiment, the inorganic material include, but are not limited to, calcium carbonate, barium sulfate, silica, magnesium oxide, zinc oxide, and so on.

In alternative exemplary embodiments, the light diffuser, the antistatic agent, and the UV blocking agent may be added to the first and second coating layers 340 and 360 only. The light diffuser, the antistatic agent, and the UV blocking agent may not be added to the base layer 320. Advantageously, the manufacturing cost can be reduced compared to a case where the light diffuser, the antistatic agent, and the UV blocking agent are added not only to the first and second coating layers 340 and 360 but also to the base layer 340.

In exemplary embodiments, the second coating layer 360 may be made of the same as or different material than the first coating layer 340. In one exemplary embodiment, the first coating layer 340 and/or the second coating layer 360 may be made from an optically transparent resin.

In an exemplary embodiment, the formation patterns of the random embossings are not limited to the illustrated examples and they may be partially formed on the first coating layer 340 according to the shape of the support 200. In one exemplary embodiment, unlike in FIG. 1, when the support 200 is partially formed on each of the plurality of lamps 100 in a triangular pyramid shape, the random embossings may be formed only on predetermined portions making contact with or corresponding to the triangular pyramids.

Figure 4:
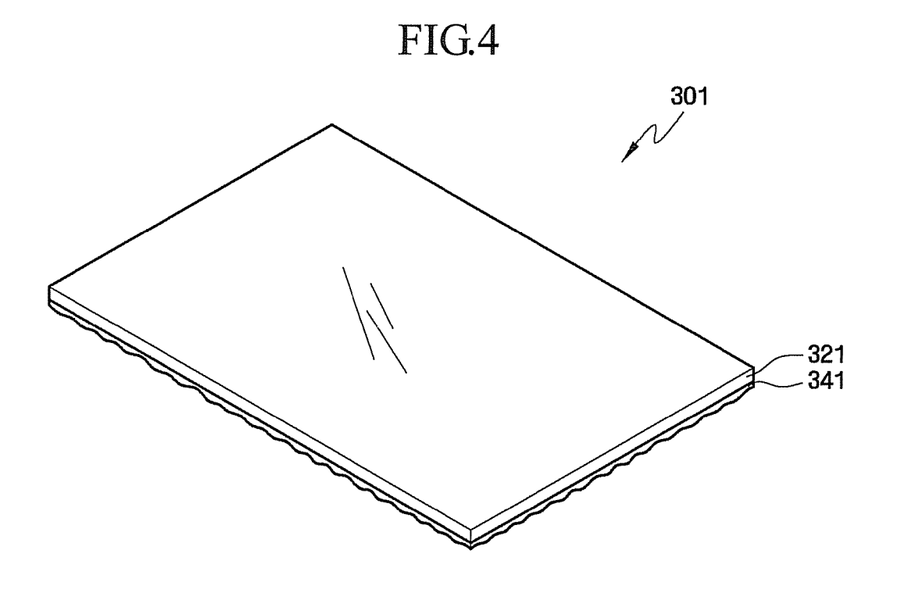
FIG. 4 is a perspective view of another exemplary embodiment of a diffusion plate according to the present invention.

FIG. 4 is a perspective view of another exemplary embodiment of a diffusion plate 301 according to the present invention.

Referring to FIG. 4, the diffusion plate 301 includes a base layer 321 and a first coating layer 341 having random embossings. The illustrated diffusion plate 301 is different from the diffusion plate 300 shown in FIG. 2 in that no second coating layer is provided.

In a case where an optical member (not shown) without embossings or patterns formed on a surface making contact with the diffusion plate 301 is positioned on the diffusion plate 301, the diffusion plate 301 is encountered with cracking only when it contacts a support (not shown). Thus, even when the second coating layer is not provided in the diffusion plate 301, unlike in FIG. 1, the display quality can be improved.

Figure 5:
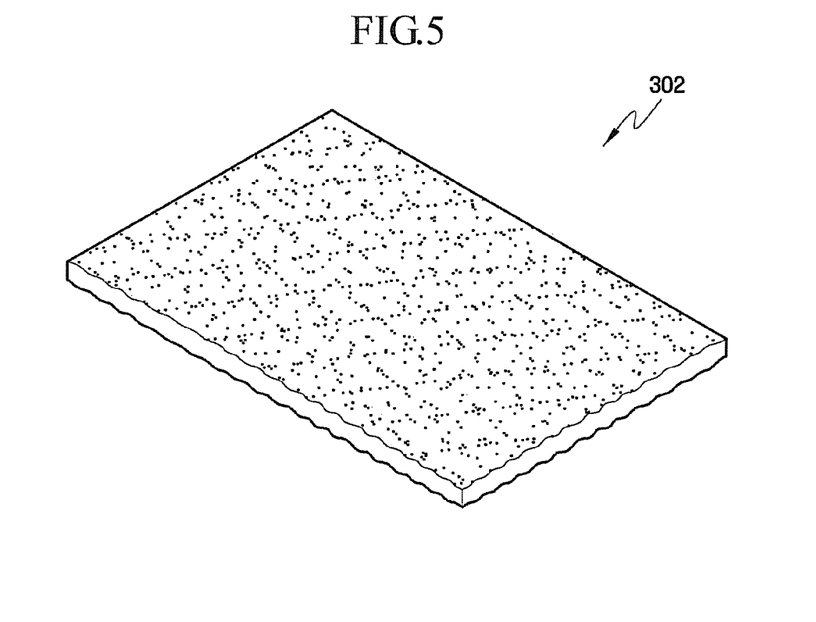
FIG. 5 is a perspective view of another exemplary embodiment of a diffusion plate according to the present invention.

FIG. 5 is a perspective view of another exemplary embodiment of a diffusion plate 302 according to the present invention;

Referring to FIG. 5, the diffusion plate 302 is formed of a single layer made of an optically transparent resin and includes a light diffuser. The diffusion plate 302 has embossings formed on both of opposing surfaces thereof. The illustrated diffusion plate 302 is different from the diffusion plate 300 shown in FIG. 2 in that it is formed of a single layer.

Random embossings are formed on a lower surface of the diffusion plate 302 and a upper surface thereof. In exemplary embodiments, the random embossings may be formed such that the 60° gloss of the lower surface of the diffusion plate 302 facing and opposite to a lamp is not greater than 15% and the upper surface thereof is approximately 20%. In an exemplary embodiment, the embossings may be formed such that a difference in the 60° gloss between the lower surface and the upper surface becomes not greater than 15%. In one exemplary embodiment, the 60° gloss of the lower surface may be in a range of 5 to 15% and the 60° gloss of the upper surface may be approximately 20%.

In alternative exemplary embodiment, the formation patterns of the embossings are not limited to those shown in FIG. 5. Rather, the embossings may be formed only on the surface facing a lamp and they may not be formed on the other surface.

The diffusion plate 302 has reduced cracking, thereby improving a display quality of a LCD comprising the same.

Hereinafter, an exemplary embodiment of a method and apparatus for manufacturing a diffusion plate having random embossings will be described with reference to FIG. 6.

Figure 6A:
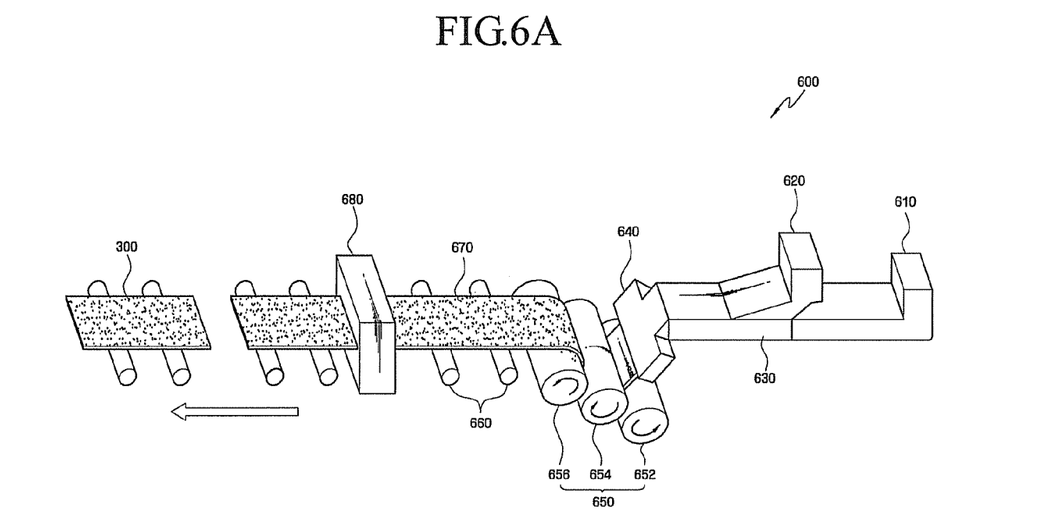
FIG. 6A is a view for explaining an exemplary embodiment of a method and apparatus of manufacturing a diffusion plate according to the present invention.
Figure 6B:
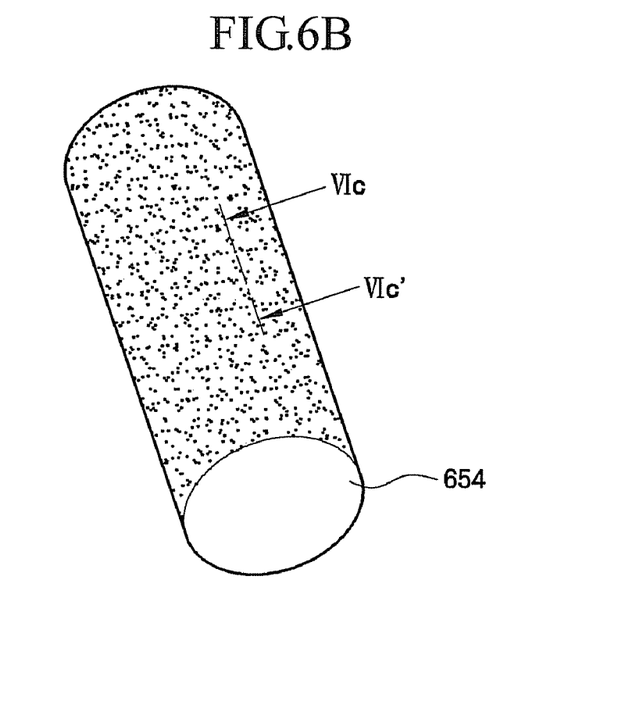
FIG. 6B is a perspective view of the second polishing roll illustrated in FIG. 6A.
Figure 6C:
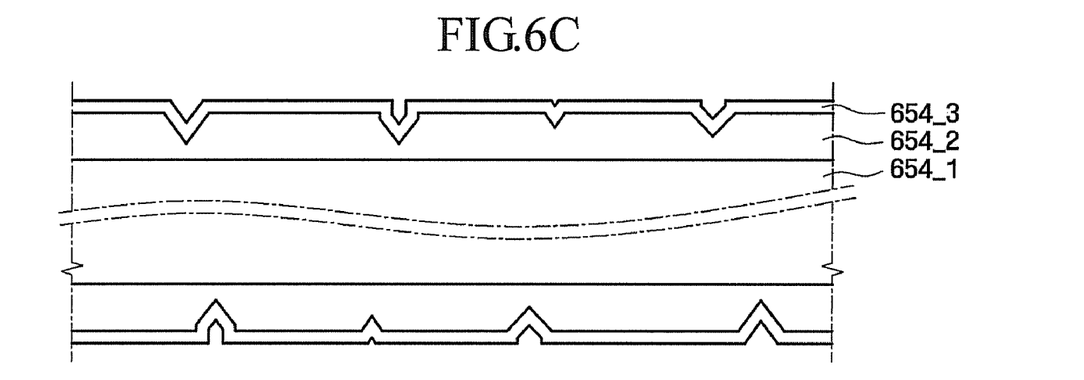
FIG. 6C is a cross-sectional view of the second polishing roll taken along a line VIc-VIc' illustrated in FIG. 6B.

FIG. 6A is a view for explaining an exemplary embodiment of a method and apparatus of manufacturing a diffusion plate according to the present invention, FIG. 6B is a perspective view of a second polishing roll illustrated in FIG. 6A and FIG. 6C is a cross-sectional view of the second polishing roll taken along line VIc-VIc' illustrated in FIG. 6B.

Referring to FIG. 6, a diffusion plate manufacturing apparatus 600 includes first and second extrusion members 610 and 620, a feed member 630, a die member 640, a polishing member 650, a guide member 660 and a cutting member 680. These features are hereinafter referred to as first and second melting extrusion blocks 610 and 620, a feed block 630, a T-die 640, a polishing roll block 650, a guide roll 660 and a cutting block 680.

A first optically transparent resin is injected into the first melting extrusion block 610 and a second optically transparent resin including a light diffuser is injected into the second melting extrusion block 620. The first and second melting extrusion blocks 610 and 620 melt the injected first and the second optically transparent resin and extrude the molten resin to the feed block 630.

The feed block 630 is supplied with the first and the second optically transparent resin to form a layer. The base layer 320 shown in FIG. 1 is formed from the first optically transparent resin and the first and second coating layers 340 and 360 are formed by laminating the second optically transparent resin on opposite surfaces of the base layer 320.

The T-die 640 adjusts thicknesses of various laminated layers, such as the base layer 320 and the first and second coating layers 340 and 360, to predetermined levels. The laminated layers are transferred to the polishing roll block 650.

The polishing roll block 650 includes first through third polishing sub-members 652, 654, and 656, such as polishing rolls. Random embossings may be formed on combination of the polishing sub-members 652, 654 and 656. In one exemplary embodiment, the random embossings may be formed on the second and third polishing rolls 654 and 656, which will later be described with reference to FIGS. 6B and 6C.

While molten resin passes between the first polishing roll 652 and the second polishing roll 654, the random embossings are formed on one surface of the molten resin. While the resultant resin having the random embossings formed on the one surface passes between the second polishing roll 654 and the third polishing roll 656, random embossings are formed on the other (opposite) surface of the resin.

The diffusion film 670 having random embossings formed on its both surfaces is transferred to the guide roll 660 and to the cutting block 680. The cutting block 680 cuts the diffusion film 670 into a size of the diffusion plate 300. In one exemplary embodiment, the final diffusion plate 300 shown in FIG. 1 is completed through the above-described processes.

Referring to FIG. 6B, the random embossings are formed on the second polishing roll 654. Referring to FIG. 6C, the second polishing roll 654 has a base roll 654_1 coated with a film 654_2, such as a copper film, and a passivation layer 654_3. The random embossings are formed as follows. The copper film 654_2, which is a relatively soft film, is applied onto the base roll 654_1 of a cylindrical shape. The copper film 654_2 is treated, such as being subjected to a power-adjustable laser irradiation and/or sand blasting treatment, thereby forming the random embossings. The passivation layer 654_3, which is a relatively hard layer, is applied onto the treated product having the formed random embossings.

In an exemplary embodiment, the copper film 654_2 may include a soft material including, but not limited to, aluminum, or lead as well as copper. The passivation layer 654_3 may include a hard material including, but not limited to, chromium, molybdenum, tungsten, or the like.

In addition, extents (frequency, density and/or dimension) of the embossings formed on the second polishing roll 654 and the third polishing roll 656 may be made different, such as is illustrated in FIG. 1 in which the extents of the embossings formed on the first coating layer 340 and the second coating layer 360 are different.

While the diffusion plate manufacturing apparatus and method have been described with regard to the diffusion plate 300 shown in FIG. 1, the same can also be applied to the diffusion plates 301 and 302 shown in FIGS. 4 and 5, respectively. The diffusion plate 301 shown in FIG. 4 may correspond to an exemplary embodiment where the embossings are formed only on the second polishing roll 654 of the diffusion plate manufacturing apparatus 600, while the single-layered diffusion plate 302 shown in FIG. 5 may correspond to an exemplary embodiment where the second melting extrusion block 620 is removed from the diffusion plate manufacturing apparatus 600.

Figure 7:
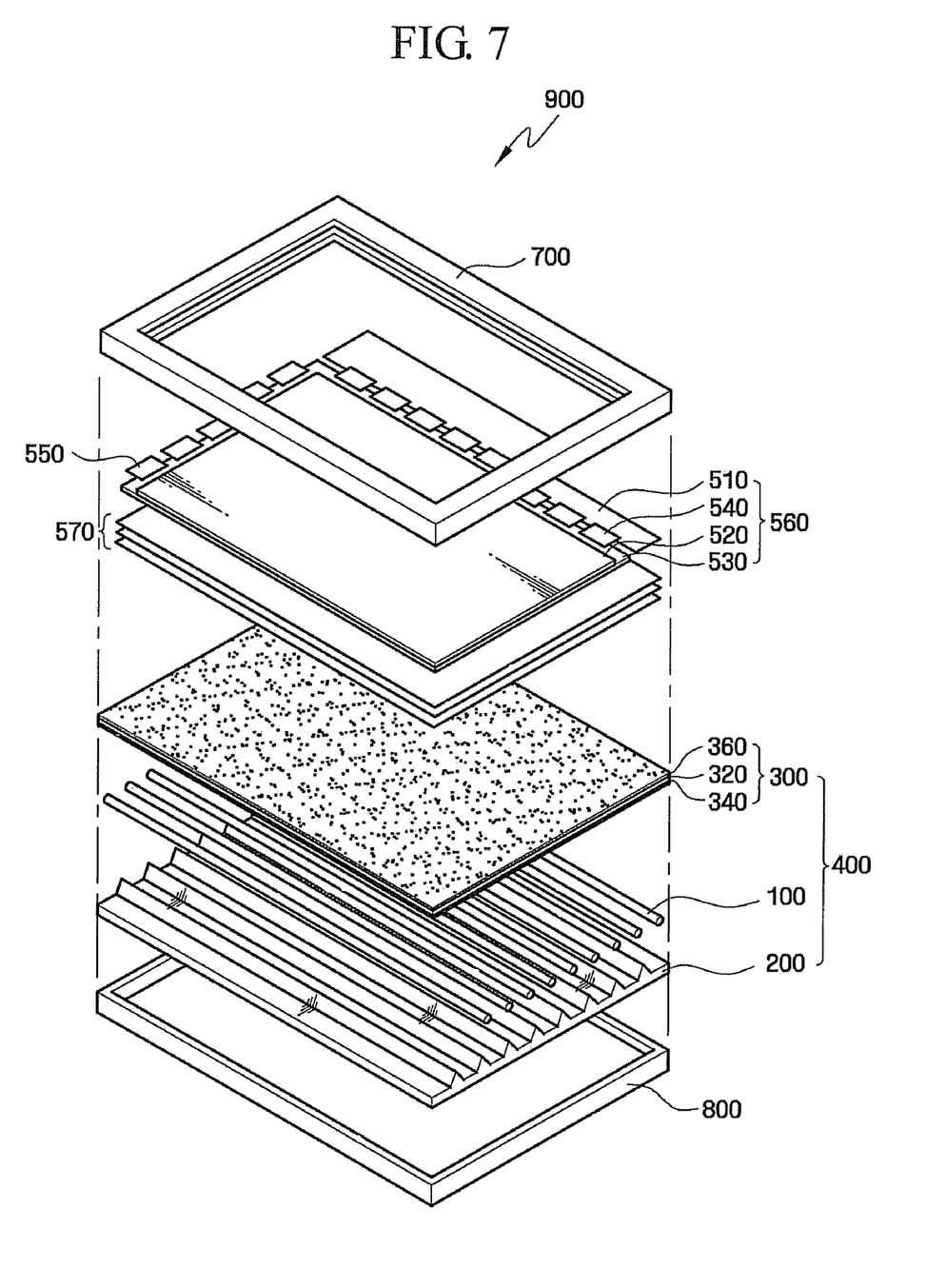
FIG. 7 is an exploded perspective view of a liquid crystal display (LCD) according to an embodiment of the present invention.

FIG. 7 is an exploded perspective view of a liquid crystal display ("LCD") 900 according to an embodiment of the present invention.

Referring to FIG. 7, the LCD 900 includes a liquid crystal panel 560, an optical member 570, such as a plurality of optical sheets, a backlight assembly 400, a top receiving container 700 and a bottom receiving container 800.

The liquid crystal panel assembly 560 includes a first substrate 520 having a printed circuit board 510 and a color filter, a second substrate 530 having a thin film transistor and a pixel electrode, liquid crystals (not shown), a data driving IC 540 for driving data and a gate driving IC 550 for driving gates.

The printed circuit board 510 allows driving signals to be applied to the data driving IC 540 and the gate driving IC 550. Various circuit components (not shown) capable of processing the driving signals are mounted on the printed circuit board 510.

The optical sheets 570 are disposed over the backlight assembly 400 and diffuse and focus the light transferred from the backlight assembly 400. The optical member 570 may include a plurality of sheets such as a diffusion plate, a prism sheet, and so on. In exemplary embodiments, embossings or patterns for performing a particular function, e.g., diffusion, may be formed on a surface of the optical member 570 facing and opposite to the backlight assembly 400.

The top receiving container 700 and the bottom receiving container 800 are engaged with each other and accommodates a liquid crystal panel assembly 560, the optical member 570 and a backlight assembly 400 within an internal space produced therein. In an exemplary embodiment, the bottom receiving container 800 may be integrally formed with the support 200 or a reflective plate (not shown).

As shown in FIG. 1, the backlight assembly 400 includes the plurality of lamps 100, a support 200 and a diffusion plate 300 and provides light by being installed in bottom of an optical member 570. Here, the same reference numerals denote the same elements in FIGS. 1 through 3, and thus any further descriptions of the same elements will be omitted.

In exemplary embodiments of the LCD 900 according to the present invention, occurrence of cracking due to a contact between the diffusion plate 300 and the support 200 or a contact between the diffusion plate 300 and the optical member 570 is reduced, thereby improving a display quality. In addition, a light diffuser may not added to the base layer 320 and the light diffuser may be added only to the first and second coating layers 340 and 360 of the diffusion plate 300. Since a protective film made of polyethylene is not necessary, the manufacturing cost of the diffusion plate 300 can be reduced, thereby ultimately reducing the manufacturing cost of the LCD 900. In an exemplary embodiment, the diffusion plate included in the LCD 900 is not limited to the one illustrated in FIG. 1, i.e., the diffusion plate 300, and may comprise the diffusion plates 301 and 302 illustrated in FIGS. 4 and 5.

As in the illustrated exemplary embodiments, the diffusion plate, backlight assembly and liquid crystal display having the same of the present invention provide at least the following advantages.

First, cracking of a diffusion plate can be reduced or effectively avoided.

Second, a good image quality can be achieved by reducing cracking of a diffusion plate.

Third, it is possible to lower the manufacturing cost of a diffusion plate, a backlight assembly and an LCD including the same while achieving a good image quality.

While the present invention has been particularly shown and described with reference to exemplary embodiments thereof, it will be apparent to those skilled in the art that the scope of the invention is given by the appended claims, rather than the preceding description, and all variations and equivalents which fall within the range of the claims are intended to be embraced therein. Therefore, it should be understood that the above embodiments are not limitative, but illustrative in all aspects.

What is claimed is:

1. A diffusion plate comprising:
   a base layer including a first optically transparent resin;
   a first coating layer provided on a first surface of the base layer, the first coating layer including a second optically transparent resin and random embossings, and
   a second coating layer on a second surface of the base layer, the second surface being opposite the first surface, the second coating layer having a higher gloss than the first coating layer,
   wherein the first surface including the embossings has a 60° gloss of 15% or less, and
   wherein a gloss difference between the first coating layer and the second coating layer is 15% or less.

2. The diffusion plate of claim 1, wherein the second coating layer has a 60° gloss of 20% or less.

3. The diffusion plate of claim 1, wherein both the first and the second coating layer are provided with a light diffuser and the base layer is not provided with a light diffuser.

4. A diffusion plate made of an optically transparent resin, the diffusion plate comprising:
   a light diffuser; and
   random embossings formed on a first surface of the light diffuser, and formed on a second surface thereof, the second surface being opposite to the first surface
   wherein the second surface has a higher gloss than the first surface thereof,
   wherein the first surface including the random embossings has a 60° gloss of 15% or less, and
   wherein a gloss difference between the first and the second surfaces is 15% or less.

5. The diffusion plate of claim 4, wherein the second surface including random embossings has a 60° gloss of 20% or less.

6. A backlight assembly comprising:
   a diffusion plate including:
      a base layer including a first optically transparent resin;
      a first coating layer provided on a first surface of the base layer, the first coating layer including a second optically transparent resin and random embossings; and
      a second coating layer on a second surface of the base layer, the second surface being opposite to the first surface and the second coating layer having a higher gloss than the first coating layer,
      wherein the first surface has a 60° gloss of 15% or less, and a gloss difference between the first and second coating layers is 15% or less;
   a plurality of lamps facing and opposite to the first coating layer and providing the diffusion plate with light; and
   a support disposed between each of the plurality of lamps and supporting the plurality of lamps and the diffusion plate.

7. The backlight assembly of claim 6, wherein the second coating layer has a 60° gloss of 20% or less.

8. The backlight assembly of claim 6, wherein both the first and the second coating layer are provided with a light diffuser and the base layer is not provided with a light diffuser.

9. A liquid crystal display ("LCD") comprising:
   a backlight assembly comprising:
      a diffusion plate including:
         a base layer including a first optically transparent resin;
         a first coating layer provided on a first surface of the base layer, the first coating layer including a second optically transparent resin and random embossings; and
         a second coating layer on a second surface of the base layer, the second surface being opposite to the first surface and the second coating layer having a higher gloss than the first coating layer,
         wherein the first surface has a 60° gloss of 15% or less, and a gloss difference between the first coating layer and the second coating layer is 15% or less,
      a plurality of lamps facing and opposite to the first coating layer and providing the diffusion plate with light, and
      a support disposed between each of the plurality of lamps and supporting the plurality of lamps and the diffusion plate; and
   a liquid crystal panel assembly disposed on top of the backlight assembly and provided with the light from the backlight assembly to display images.

10. The LCD of claim 9, wherein the second coating layer has a 60° gloss of 20% or less.

11. The LCD of claim 9, wherein both the first and the second coating layer are provided with a light diffuser and the base layer is not provided with a light diffuser.

12. A method of forming a diffusion plate, the method comprising:
   forming a base layer including a first optically transparent resin;
   providing random embossings on the base layer; and
   sizing the diffusion plate to predetermined dimensions;
   wherein the providing random embossings includes:
      forming random embossings on a first coating layer;
      providing the first coating layer on a first surface of the base layer, the first coating layer including a second optically transparent resin;
      forming random embossings on a second coating layer having a higher gloss than the first coating layer, the second coating layer having a 60° gloss of 25% or less; and
      providing the second coating layer on a second surface of the base layer, the second surface being opposite to the first surface,
      wherein the first surface has a 60° gloss of 15% or less, and a gloss difference between the first coating layer and the second coating layer is 15% or less.

* * * * *